(12) United States Patent
DeMania et al.

(10) Patent No.: US 8,056,227 B2
(45) Date of Patent: Nov. 15, 2011

(54) TURBINE BLADE HAVING MATERIAL BLOCK AND RELATED METHOD

(75) Inventors: Alan Richard DeMania, Niskayuna, NY (US); Alan Donn Maddaus, Rexford, NY (US); Steven Russell Pock, Windham, ME (US)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 12/366,688

(22) Filed: Feb. 6, 2009

(65) Prior Publication Data

US 2010/0199496 A1 Aug. 12, 2010

(51) Int. Cl.
*B21D 53/78* (2006.01)
*F01D 5/30* (2006.01)
(52) U.S. Cl. .............. 29/889.21; 29/889.7; 416/189; 416/193 R; 416/195; 416/196 R; 416/241 R
(58) Field of Classification Search .............. 416/193 R, 416/195, 196 R, 223 A, 912, 189, 241 R; 415/912; 29/889.7, 889.21, 889.23
See application file for complete search history.

(56) References Cited

U.S. PATENT DOCUMENTS

| | | | | |
|---|---|---|---|---|
| 2,373,827 A | * | 4/1945 | Halford et al. | 451/28 |
| 3,412,611 A | * | 11/1968 | Eccles et al. | 416/196 R |
| 3,612,718 A | * | 10/1971 | Palfreyman et al. | 416/135 |
| 3,692,429 A | * | 9/1972 | Redding | 416/201 R |
| 4,537,538 A | * | 8/1985 | Mitamura et al. | 409/217 |
| 4,919,593 A | * | 4/1990 | Brown | 416/223 A |
| 5,160,242 A | * | 11/1992 | Brown | 416/193 A |
| 5,288,209 A | * | 2/1994 | Therrien et al. | 416/193 R |
| 6,616,408 B1 | * | 9/2003 | Meier | 416/193 A |
| 6,682,306 B2 | * | 1/2004 | Murakami et al. | 416/189 |
| 7,448,844 B1 | * | 11/2008 | Johnson | 415/9 |
| 7,836,594 B2 | * | 11/2010 | Rose | 29/889.1 |

* cited by examiner

*Primary Examiner* — Seungsook Ham
(74) *Attorney, Agent, or Firm* — Hoffman Warnick LLC; Ernest G. Cusick

(57) ABSTRACT

A turbine blade including a root section at an end of the turbine blade, a first airfoil section adjacent to the root section, and a tip section adjacent to the airfoil section and including a material block that is incongruous with the airfoil section. A midspan section may also include a material block. Each material block can be selectively machined to customize the length of the turbine blade and the position of a tip shroud connection or midspan connection. The turbine blade can be sized for retrofitting last stage blades of older turbines. A radial position of the root mounts for the turbine blade may also be adjusted to provide further customization.

2 Claims, 5 Drawing Sheets

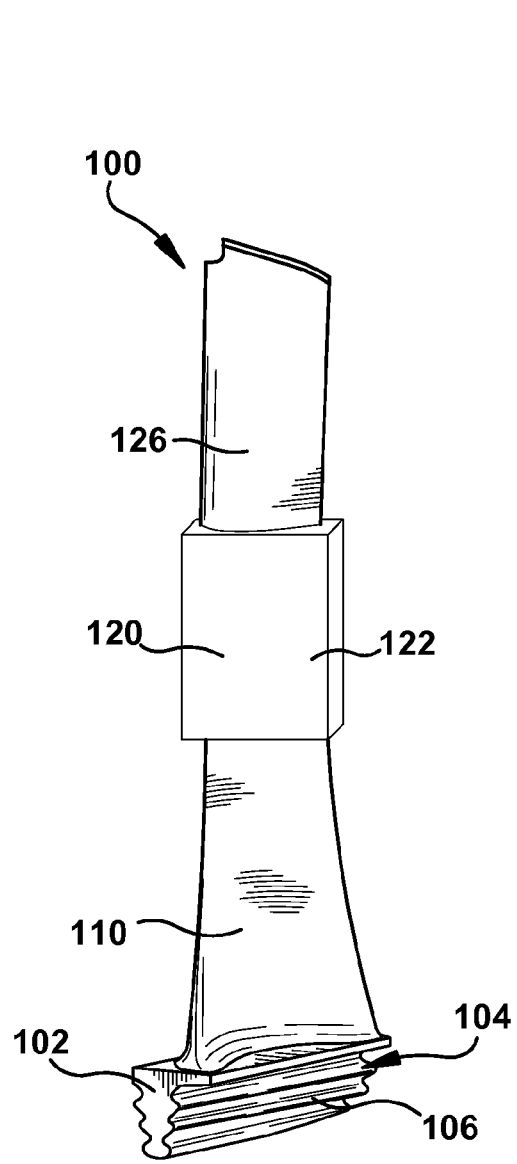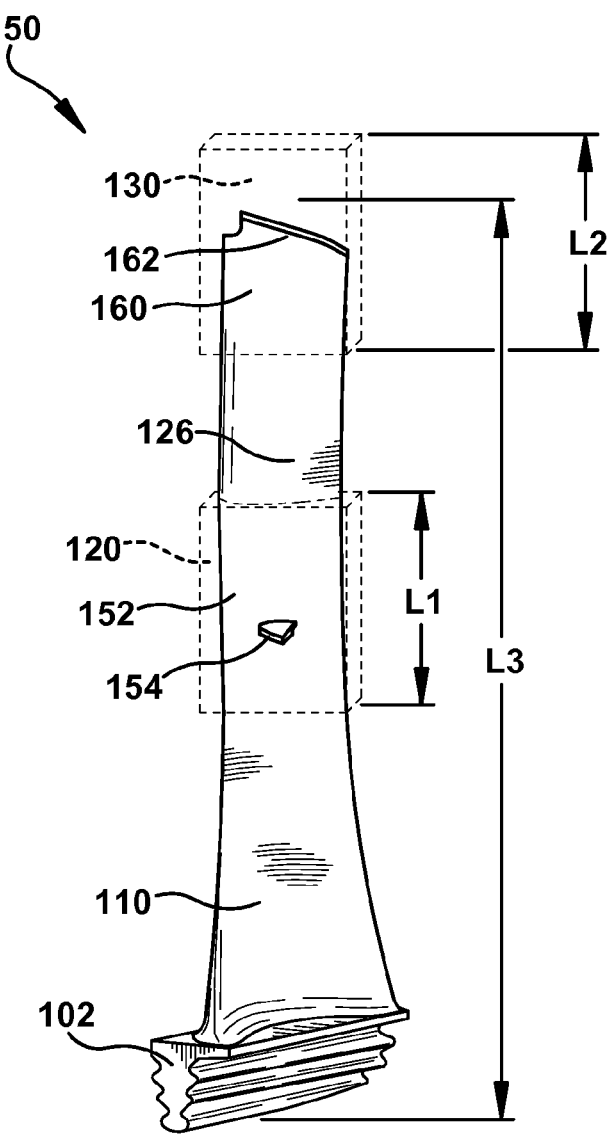
Fig. 2C
Fig. 3

TURBINE BLADE HAVING MATERIAL BLOCK AND RELATED METHOD

BACKGROUND OF THE INVENTION

The invention relates generally to turbine blade technology. More particularly, the invention relates to a turbine blade having material block(s) to allow for customization for retrofitting last stage blades of older turbines and a related method.

In the turbine industry, turbines may be periodically upgraded. One technique that is used to upgrade a turbine is to replace old turbine blades with more efficient design.

BRIEF DESCRIPTION OF THE INVENTION

A first aspect of the disclosure provides a turbine blade comprising: a root section at an end of the turbine blade; a first airfoil section adjacent to the root section; a midspan section adjacent to the first airfoil section and including a first material block; a second airfoil section adjacent to the midspan section; and a tip section adjacent to the second airfoil section and including a second material block, wherein the first and second material block are incongruous with any adjacent airfoil section.

A second aspect of the disclosure provides a method comprising: obtaining a turbine blade including: a root section at an end of the turbine blade, a first airfoil section adjacent to the root section, a midspan section adjacent to the first airfoil section and including a first material block, a second airfoil section adjacent to the midspan section, and a tip section adjacent to the second airfoil section and including a second material block, the first and second material block being incongruous with any adjacent airfoil section; and selectively machining the second material block to include a tip shroud at a selected length for the turbine blade.

A third aspect of the invention is directed to a turbine blade comprising: a root section at an end of the turbine blade; a first airfoil section adjacent to the root section; and a tip section adjacent to the first airfoil section and including a first material block, wherein the first material block is incongruous with the first airfoil section.

BRIEF DESCRIPTION OF THE DRAWINGS

FIGS. 2A-2C show perspective views of embodiments of a turbine blade according to the invention.

FIG. 3 shows a perspective view of one embodiment of the turbine blade of FIG. 2A after machining.

DETAILED DESCRIPTION OF THE INVENTION

Figure 1:
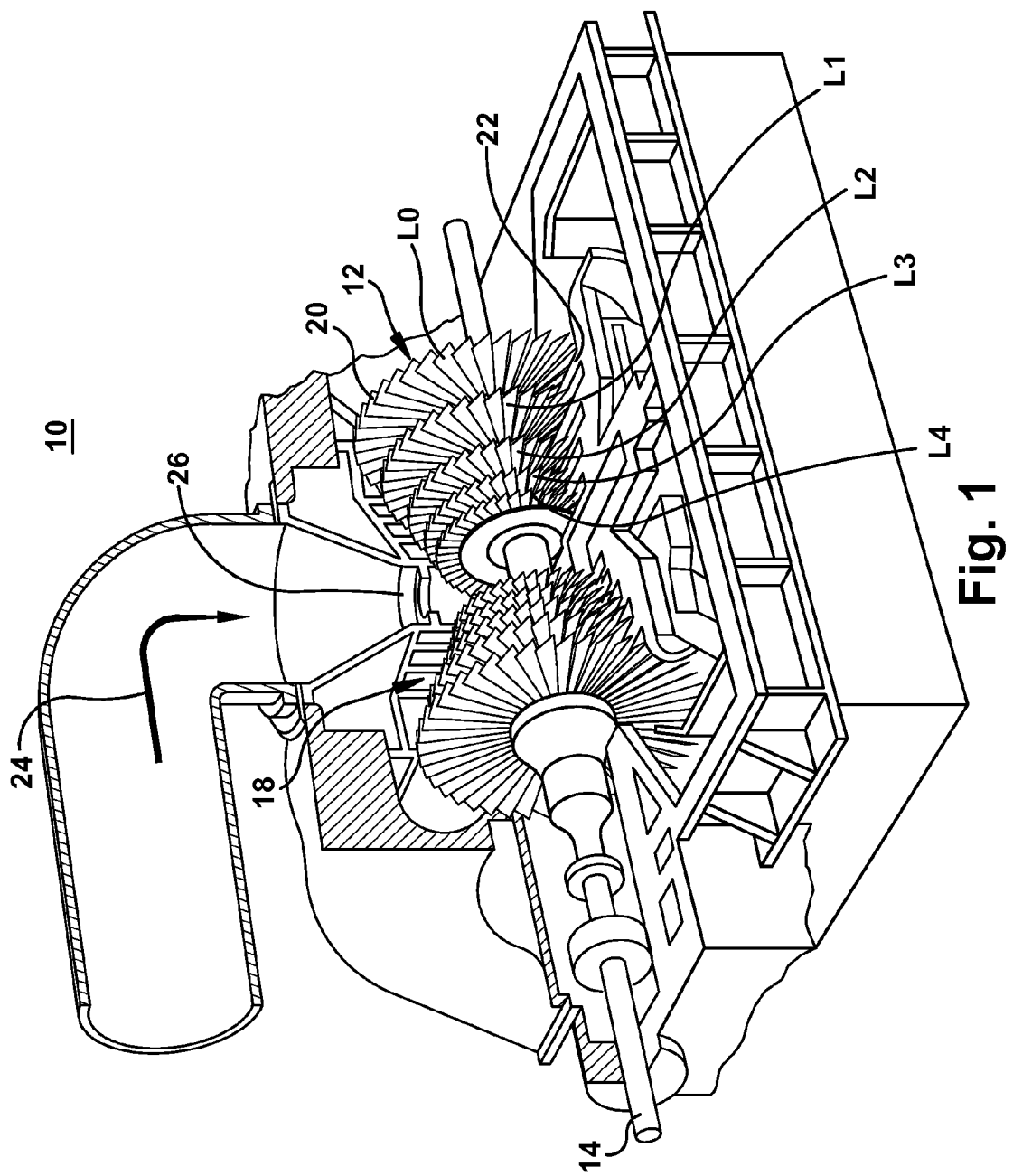
FIG. 1 shows a perspective partial cut-away illustration of a steam turbine.

Referring to the drawings, FIG. 1 shows a perspective partial cut-away illustration of a multiple stage, steam turbine 10. Turbine 10 includes a rotor 12 that includes a rotating shaft 14 and a plurality of axially spaced rotor wheels 18. A plurality of rotating blades 20 are mechanically coupled to each rotor wheel 18. More specifically, blades 20 are arranged in rows that extend circumferentially around each rotor wheel 18. A plurality of stationary vanes 22 extends circumferentially around shaft 14, and the vanes are axially positioned between adjacent rows of blades 20. Stationary vanes 22 cooperate with blades 20 to form a stage and to define a portion of a steam flow path through turbine 10.

In operation, steam 24 enters an inlet 26 of turbine 10 and is channeled through stationary vanes 22. Vanes 22 direct steam 24 downstream against blades 20. Steam 24 passes through the remaining stages imparting a force on blades 20 causing shaft 14 to rotate. At least one end of turbine 10 may extend axially away from rotating shaft 12 and may be attached to a load or machinery (not shown) such as, but not limited to, a generator, and/or another turbine.

In one embodiment, turbine 10 may include five stages. The five stages are referred to as L0, L1, L2, L3 and L4. Stage L4 is the first stage and is the smallest (in a radial direction) of the five stages. Stage L3 is the second stage and is the next stage in an axial direction. Stage L2 is the third stage and is shown in the middle of the five stages. Stage L1 is the fourth and next-to-last stage. Stage L0 is the last stage and is the largest (in a radial direction). It is to be understood that five stages are shown as one example only, and each turbine may have more or less than five stages. Also, as will be described herein, the teachings of the invention do not require a multiple stage turbine.

Figure 2A:
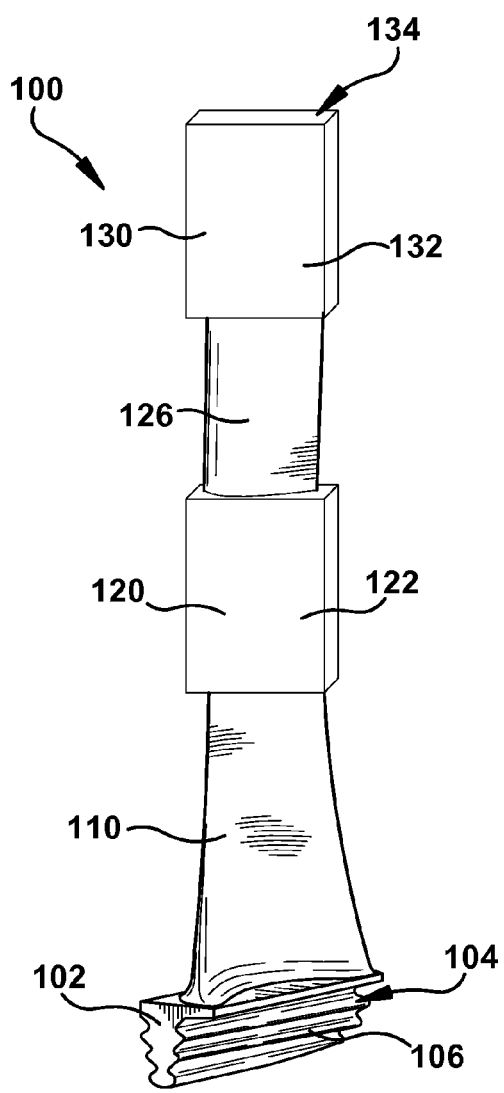
Figure 2B:
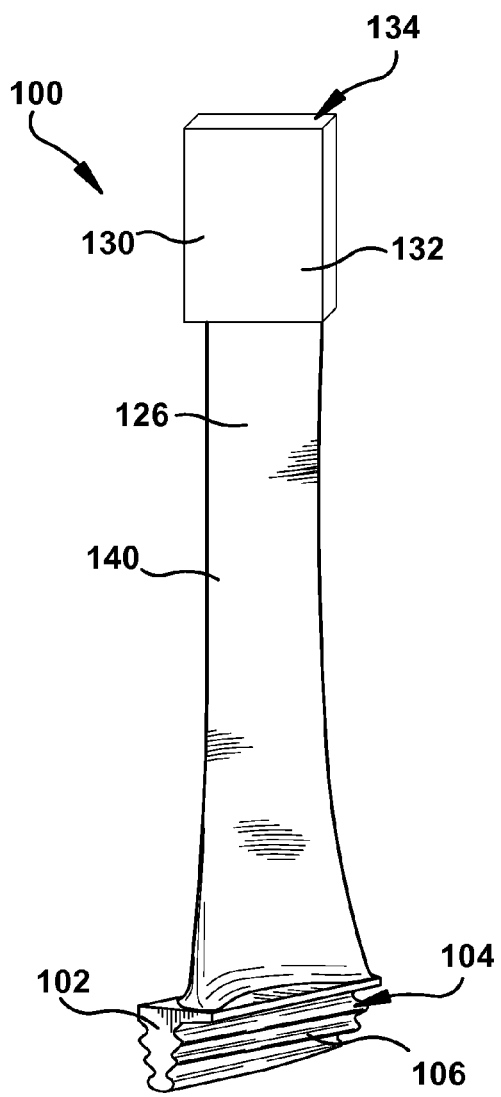

FIGS. 2A-B show perspective views of a turbine blade 100 according to embodiments of the invention. As will be described, turbine blade 100 is not an operative blade, but an intermediate product capable of being machined into a final, operative turbine blade 150 (FIG. 3) for customized replacement or retrofitting of last stage turbine blades in multiple stage turbine 10. The location of a tip shroud connection (and hence length of turbine blade 100) and/or a midspan connection can be adjusted to accommodate different applications. Turbine blade 100 is, in one embodiment, formed by forging of an appropriate metal alloy for the applications to which the turbine blade will be exposed. Some post-forging machining or other material processing may be provided in addition to the machining described herein.

Turbine blade 100 may include a root section 102 at a first end 104 of the turbine blade. Root section 102 may include a block of material for forming into complementary mating connection 106 for a root mount 108, or may include the complementary mating surface 106 as forged. As understood, and as shown in FIG. 5, root section 102 is connected to a root mount 108, which may be coupled to, for example, rotating shaft 14, or rotor wheel 18 coupled to rotating shaft 14, of multiple stage turbine 10 (FIG. 1). Root section 102 may have a shape or configuration of either the "inverted pine tree" shown in FIGS. 2A and 2B, or the "radial finger type" shown in FIGS. 4 and 5. In either case, root section 102 and root mount 108 may include complementary mating surfaces 106 for attaining a firm connection. Root mount 108 is fixedly positioned at a particular radial position relative to rotating shaft 14, thus creating a root diameter annulus for turbine blades within a particular stage.

Turbine blade 100 may also include a first airfoil section 110 adjacent to root section 102. First airfoil section 110 may have any airfoil shape now known or later developed for imparting a force to turbine blade 100 from steam 24 (FIG. 1), thus turning rotating shaft 14.

In one embodiment, as shown in FIG. 2A, a midspan section 120 may be adjacent to first airfoil section 110 and includes a first material block 122. The term "midspan" should not be interpreted to require any exactness of position along the length of turbine blade 100, only general positioning somewhat away from ends 104, 134 of turbine blade 100. A second airfoil section 126 may be adjacent to midspan section 120. Second airfoil section 126 may have any airfoil shape now known or later developed for imparting a force to turbine blade 100 from steam 24 (FIG. 1), thus turning rotating shaft 14 (FIG. 1). In one embodiment, second airfoil section 126 has an airfoil shape that can be made congruous with first airfoil section 110 by machining of first material block 122, as will be described in greater detail herein.

Turbine blade 100 also may include a tip section 130 adjacent to second airfoil section 126 and including a second material block 132. Tip section 130 constitutes a second end 134 of turbine blade 100. Although a remainder of the disclosure describes embodiments of the invention in terms of the FIG. 2A embodiment, in alternative embodiments shown in FIGS. 2B-2C, midspan section 120 (FIG. 2A) may be omitted or tip section 130 (FIG. 2A) may be omitted, respectively. In terms of the FIG. 2B embodiment, second airfoil section 126 (FIG. 2A) is made as one congruous airfoil section 140 with first airfoil section 110 (FIG. 2A). Also, in this embodiment, either no midspan connection 154 (FIG. 3) is provided or its position is not adjustable.

With further reference to first and second material blocks 122, 132, in one embodiment, the blocks are incongruous with any adjacent airfoil section. That is, the surface of any adjacent airfoil section 110, 126 does not continue along a typical path that would allow for proper functioning of turbine blade 100 where it meets a material block. In one embodiment, both blocks 122, 132 have a substantially polyhedron shape except where first and second airfoil sections 110, 126 connect to a respective material block. However, material blocks 122, 132 may have any shape that supplies a sufficient amount of material for machining of material blocks 122, 132 to form a final turbine blade 150, an example of which is shown in FIG. 3. That is, as shown in FIG. 3, first material block 122 may be machined, e.g., via grinding, to include a third airfoil section 152 that is congruous with first and second airfoil sections 110, 126 to form an operative airfoil. In addition, in one embodiment, first material block 122 may also be machined to include a midspan connection 152 for mating connection (e.g., male/female mating parts) with an adjacent turbine blade (FIG. 1) at a selected position along the length L1 of first material block 122.

As also shown in FIG. 3, second material block 132 may be machined, e.g., via grinding, to include a fourth airfoil section 160 that is congruous with second airfoil section 126 to form an operative airfoil. Furthermore, second material block 132 may be machined to selectively define a length L3 of final turbine blade 150. In an alternative embodiment, second material block 132 may be machined to include a tip shroud connection 162 (i.e., an integral cover) for mating connection with an adjacent turbine blade (FIG. 1) at a selected position along the length L2 of second material block 132. In a second alternative embodiment, not shown, material block 120 may be machined to include a midspan connection 154, but in the absence of tip section 130 without any tip shroud connection 162.

In a third alternative embodiment, material block 122, 132 may be machined to be devoid of any midspan connection 154 or tip shroud connection 162 such that turbine blade 150 is a freestanding blade (see FIG. 1).

In one embodiment, first and second material block 122, 132 constitute approximately 15 to 25 percent of a length of turbine blade 100, each. However, other dimensions may also be employed.

Figure 4:
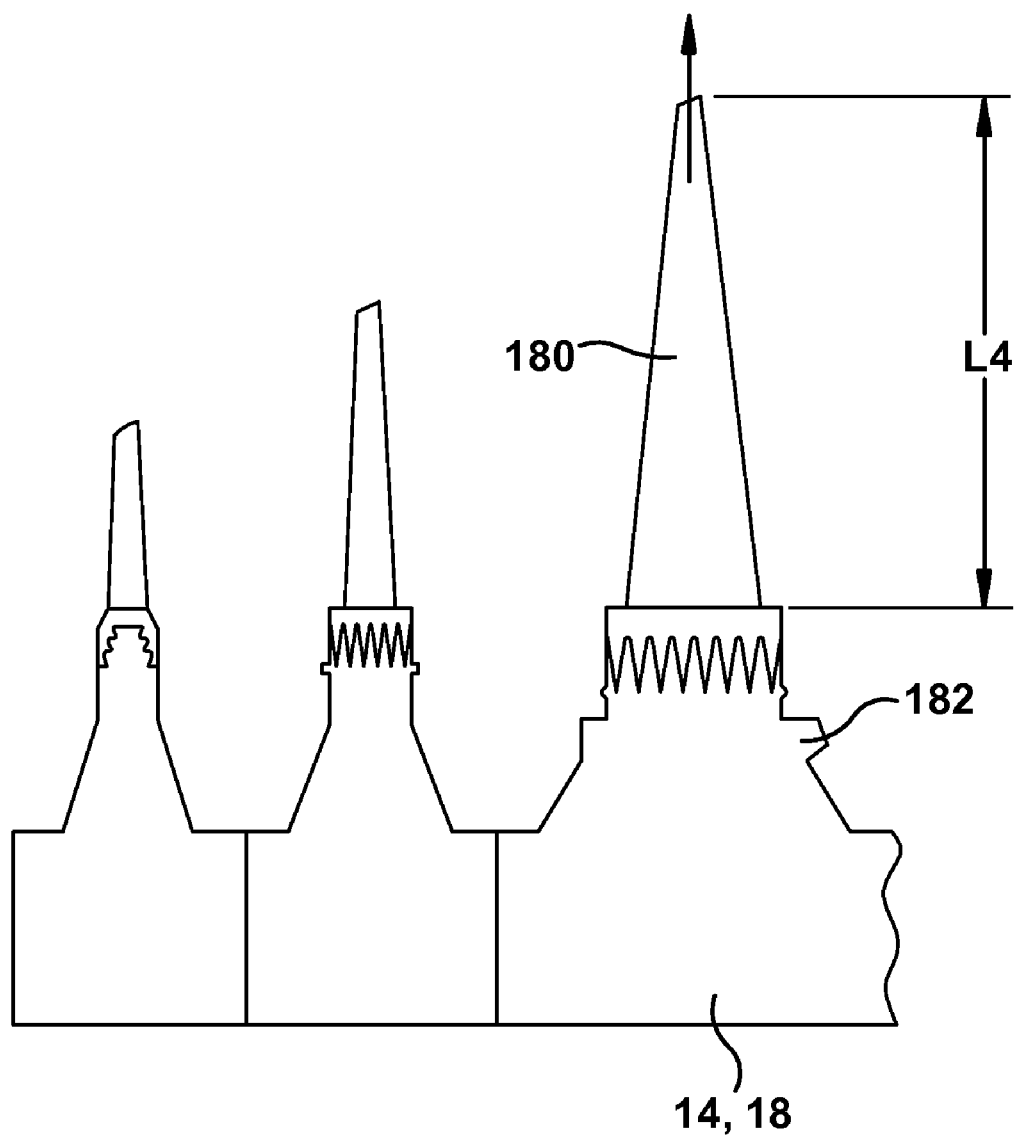
FIGS. 4-5 show cross-sectional views of a multiple stage turbine illustrating embodiments of a method of using the turbine blade of FIG. 3.
Figure 5:
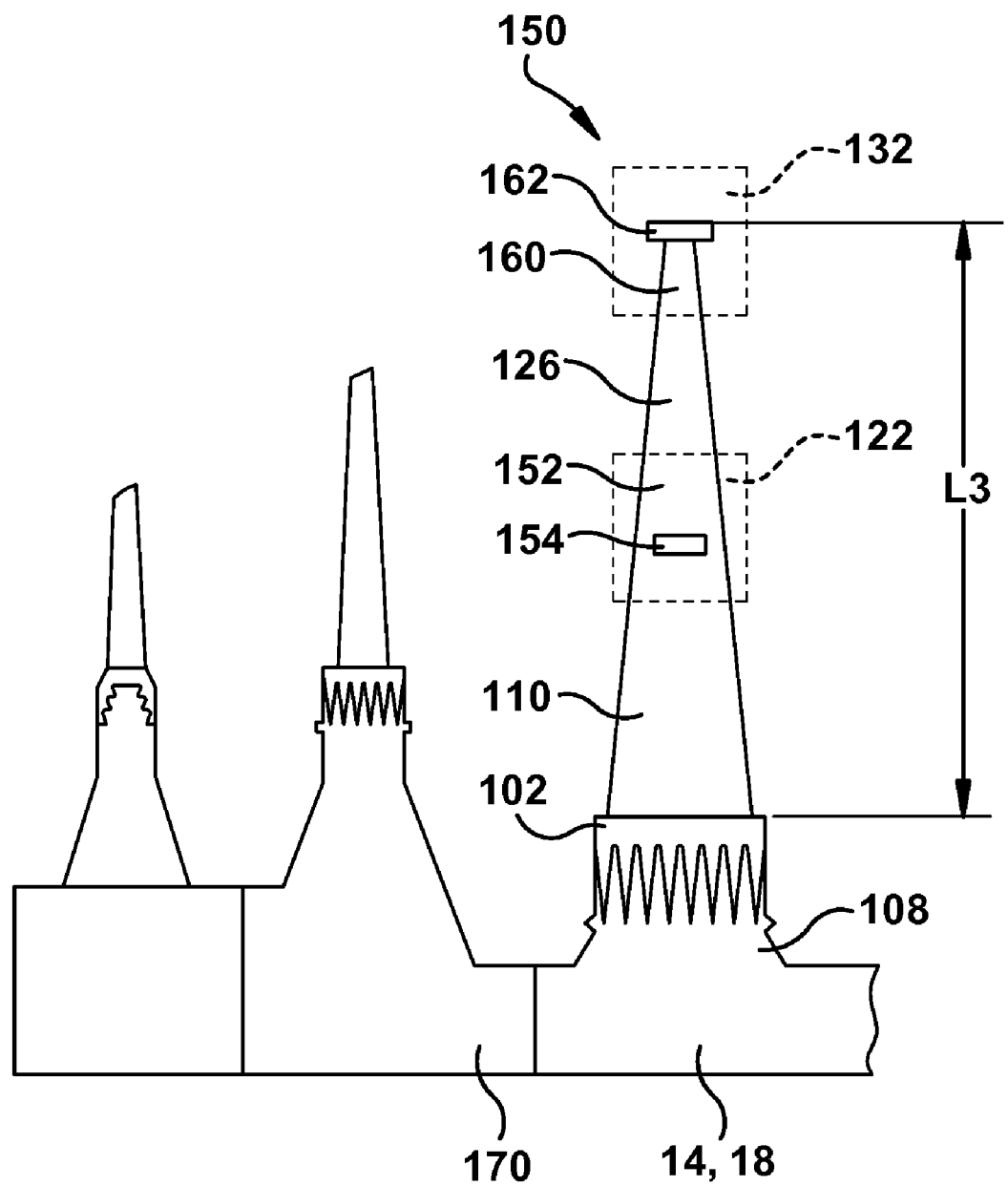

Referring to FIGS. 4-5, based on the above-described machining, turbine blade 100 is customizable for retrofit into a variety of different turbines 10 (FIG. 1). The teachings of the embodiments of the invention are particularly applicable to the last stage of the turbine where an increased exit flow area may be accomplished by increasing the airfoil length relative to the original, thereby reducing the loss associated with flow that leaves the turbine. In one embodiment, turbine blade 100 is obtained and at least second material block 132 selectively machined to a selected length L3 for turbine blade 150, and perhaps to include a tip shroud connection 160. In this fashion, as shown in FIG. 4, an old last stage turbine blade 180 having a length L4 may be removed from a root mount 182 of rotating shaft 14 (or rotor wheel 18) of a turbine. As shown in FIG. 5, a radial position of a (new) root mount 108 may be adjusted, inwardly or outwardly. Root mount 108 may be adjusted radially by, for example, creating a new rotor wheel 18 to provide the selected root diameter. Rotor wheel 18 can be machined, for example: into the existing rotation shaft 14, as an entire new rotor wheel forging if the low pressure rotating shaft is to be replaced, or as a separate wheel and stub shaft which will then be fine lined welded to the existing rotating shaft 14 after machining off the original last stage rotor wheel 18. In the example shown, a radial position of root mount 108 relative to rotating shaft 14 has been adjusted to be less than an adjacent root mount 170 for an adjacent stage of the multiple stage turbine 10 (FIG. 1). Where circumferential space limitations require, the adjusting of the radial position of root mount 108 may include removing at least one other root mount (not shown) within a stage to which the root mount 108 belongs. Similarly, root mount 108 may have a radial position greater than an adjacent root mount 170, similar to that shown in FIG. 4, and radial mounts 108 added if circumferential space allows. In any event, the selected length L3 is chosen to be compatible with the adjusted radial position of root mount 108, and any turbine casing or other structural requirements. The last stage turbine blade 180 (FIG. 4) may then be replaced with turbine blade 150 (FIG. 5).

It is also understood that conventional analysis techniques may be carried out to ensure proper functioning of turbine blade 150. For example, analysis may be completed to ensure that: exhaust loss reduction objectives are met, new tip shroud connection 162 and midspan connection 154 relative to change in pitch or spacing at these locations are properly accommodated, the new connections 154, 162 meet life requirements, vibration frequencies of the new blade and wheel construction are appropriate, and/or the flow path from the original preceding stage (L-1) blade exit to the last stage bucket entrance and corresponding nozzle diaphragm are suitable for the retrofit application. An overall aeromechanical and aerodynamic/performance analysis of turbine blade 150 (and/or stage L0 and/or turbine 10) may also be performed, as necessary.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context, (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 wt %, or, more specifically, about 5 wt % to about 20 wt %", is inclusive of the endpoints and all intermediate values of the ranges of "about 5 wt % to about 25 wt %," etc).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims

What is claimed is:

1. A method comprising:
  obtaining a turbine blade including:
    a root section at an end of the turbine blade,
    a first airfoil section adjacent to the root section,
  a midspan section adjacent to the first airfoil section and including a first material block,
    a second airfoil section adjacent to the midspan section, and
    a tip section adjacent to the second airfoil section and including a second material block, the first and second material block being incongruous with any adjacent airfoil section;
  selectively machining the second material block to include a tip shroud at a selected length for the turbine blade;
  removing a last stage turbine blade from a root mount of a rotating shaft of a turbine;
  adjusting a radial position of the root mount, wherein the selected length is chosen to be compatible with the adjusted radial position of the root mount, wherein the radial position is less than a previous radial position of the root mount and the adjusting of the radial position of the root mount includes removing at least one other root mount within a stage to which the root mount belongs; and
  replacing the last stage turbine blade with the turbine blade.

2. The method of claim 1, wherein the selective machining includes machining the turbine blade to include a midspan connection at a selected position for connection with an adjacent turbine blade.

* * * * *